(12) United States Patent
Brown et al.

(10) Patent No.: US 11,132,690 B2
(45) Date of Patent: Sep. 28, 2021

(54) PAIRING TRANSACTIONS AND NOTIFICATIONS

(71) Applicant: Wells Fargo Bank, N.A., San Francisco, CA (US)

(72) Inventors: Liesl Brown, San Francisco, CA (US); Al Hecht, Chanhassen, MN (US); John Penacerrada, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 191 days.

(21) Appl. No.: 14/745,249

(22) Filed: Jun. 19, 2015

(65) Prior Publication Data
US 2016/0371689 A1  Dec. 22, 2016

(51) Int. Cl.
*G06Q 20/40* (2012.01)
*G06Q 20/42* (2012.01)

(52) U.S. Cl.
CPC .......... *G06Q 20/405* (2013.01); *G06Q 20/42* (2013.01)

(58) Field of Classification Search
CPC ........ G06Q 40/00; G06Q 20/10; G06Q 20/40; G06Q 20/382; G06Q 30/06; G06Q 20/401; G06Q 20/3255; G06Q 40/02; G06Q 20/4014; G06Q 20/4016; G06Q 40/025; G06Q 20/102; G06Q 20/405; G06Q 40/12; G06Q 20/00; G06Q 20/02; G06Q 20/26; G06Q 30/0222; G06Q 30/0236; G06Q 30/0239; G06Q 30/04; G06Q 30/0635; G06Q 20/42; G06Q 20/425; G06Q 20/32; G06Q 20/3221; G06Q 20/24; G06Q 20/341; G06Q 20/352; G06Q 20/354; G06Q 20/3829; G06Q 10/0838; G06Q 10/10; G06Q 20/105; G06Q 20/108; G06Q 20/12; G06Q 20/127; G06Q 20/3224; G06Q 20/325; G06Q 20/34; G06Q 20/3563; G06Q 20/35758; G06Q 20/3672; G06Q 20/4012;
(Continued)

(56) References Cited

U.S. PATENT DOCUMENTS 5,920,848 A    7/1999  Schutzer et al.
7,540,411 B1   6/2009  Tannenbaum
(Continued)

OTHER PUBLICATIONS

Bartelt et al., A Multi-Criteria Taxonomy of Business Models in Electronic Commerce, In Electronic Commerce, vol. 2232 of Lecture Notes in Computer Science, Oct. 29, 2011, Spring Berlin Heidelberg, 13 pages.

*Primary Examiner* — Namrata Boveja
*Assistant Examiner* — Slade E Smith
(74) *Attorney, Agent, or Firm* — Foley & Lardner LLP

(57) ABSTRACT

A computer-implemented method performed by a processor of a financial institution computing system relates to providing a notification relating to a transaction event between an account holder and a merchant. Transaction data relating to the transaction event between the account holder and the merchant is received from the merchant. The transaction event is associated with a financial account of the account holder. A notification is defined based on the transaction data. The notification includes a trigger event and notification content, and relates to a follow-up event to be performed by the account holder with the merchant. Upon occurrence of the trigger event, the notification is transmitted to the account holder.

32 Claims, 4 Drawing Sheets

(58) Field of Classification Search
CPC .. G06Q 2220/00; G06Q 30/016; G06Q 30/02;
G06Q 30/0224; G06Q 50/186; G06F
2203/0331; G06F 3/014; G06K 19/045
USPC .......................................................... 705/44
See application file for complete search history.

(56) References Cited

U.S. PATENT DOCUMENTS

| | | | | |
|---|---|---|---|---|
| 8,041,636 | B1* | 10/2011 | Hunter | G06Q 40/06 |
| | | | | 705/40 |
| 8,620,780 | B2 | 12/2013 | Krakowiecki et al. | |
| 8,682,793 | B2 | 3/2014 | Carlson et al. | |
| 8,706,557 | B1* | 4/2014 | Tavares | G06Q 20/10 |
| | | | | 705/21 |
| 8,762,239 | B2 | 6/2014 | Maw | |
| 8,812,351 | B2 | 8/2014 | Zollino et al. | |
| 9,665,898 | B2* | 5/2017 | Scholl | G06Q 30/0601 |
| 9,681,359 | B2* | 6/2017 | Ramalingam | G06Q 30/0261 |
| 2005/0251425 | A1* | 11/2005 | Fox | G16H 10/60 |
| | | | | 705/3 |
| 2005/0283753 | A1* | 12/2005 | Ho | G06Q 10/10 |
| | | | | 717/102 |
| 2007/0288373 | A1* | 12/2007 | Wilkes | G06Q 40/02 |
| | | | | 705/42 |
| 2008/0071465 | A1* | 3/2008 | Chapman | G01C 21/3691 |
| | | | | 701/117 |
| 2009/0070181 | A1 | 3/2009 | Loeffen | |
| 2009/0210886 | A1* | 8/2009 | Bhojwani | G06Q 20/3221 |
| | | | | 719/318 |
| 2009/0254476 | A1 | 10/2009 | Sharma et al. | |
| 2010/0094774 | A1 | 4/2010 | Jackowitz et al. | |
| 2010/0235285 | A1* | 9/2010 | Hoffberg | G06Q 20/401 |
| | | | | 705/75 |
| 2010/0274689 | A1* | 10/2010 | Hammad | G08B 25/004 |
| | | | | 705/30 |
| 2010/0274691 | A1 | 10/2010 | Hammad et al. | |
| 2011/0054978 | A1 | 3/2011 | Mohil | |
| 2011/0161116 | A1* | 6/2011 | Peak | G01C 21/36 |
| | | | | 705/4 |
| 2011/0238476 | A1* | 9/2011 | Carr | H04W 4/21 |
| | | | | 705/14.25 |
| 2011/0238517 | A1* | 9/2011 | Ramalingam | G06Q 20/40 |
| | | | | 705/26.1 |
| 2011/0320275 | A1* | 12/2011 | O'Sullivan | G06Q 30/0251 |
| | | | | 705/14.53 |
| 2012/0226440 | A1 | 9/2012 | Nagda | |
| 2013/0030993 | A1* | 1/2013 | Peace | G06Q 20/4016 |
| | | | | 705/39 |
| 2013/0060670 | A1 | 3/2013 | Galloway et al. | |
| 2013/0103538 | A1* | 4/2013 | Scholl | G06Q 30/02 |
| | | | | 705/26.7 |
| 2013/0325598 | A1* | 12/2013 | Shao | G06Q 30/02 |
| | | | | 705/14.49 |
| 2013/0325599 | A1* | 12/2013 | Yeri | G06Q 40/02 |
| | | | | 705/14.49 |
| 2014/0006198 | A1 | 1/2014 | Daly et al. | |
| 2014/0064223 | A1 | 3/2014 | Stephens et al. | |
| 2014/0067737 | A1 | 3/2014 | Kapadia et al. | |
| 2014/0136265 | A1 | 5/2014 | Kinsey, II | |
| 2014/0136266 | A1 | 5/2014 | Kinsey et al. | |
| 2014/0143139 | A1 | 5/2014 | Koplovitz et al. | |
| 2014/0164224 | A1 | 6/2014 | Grigg et al. | |
| 2014/0172577 | A1* | 6/2014 | Rephlo | G06Q 20/322 |
| | | | | 705/14.64 |
| 2014/0195396 | A1 | 7/2014 | Bhakta et al. | |
| 2014/0207548 | A1 | 7/2014 | Basnight et al. | |
| 2014/0266686 | A1* | 9/2014 | Torgersrud | G06Q 20/40 |
| | | | | 340/521 |
| 2014/0365304 | A1* | 12/2014 | Showers | G01S 5/0252 |
| | | | | 705/14.55 |
| 2015/0081557 | A1* | 3/2015 | Kinfoil | G06Q 20/4014 |
| | | | | 705/44 |
| 2015/0095216 | A1* | 4/2015 | Van Heerden | G06Q 40/02 |
| | | | | 705/39 |
| 2015/0199699 | A1* | 7/2015 | Milton | G06Q 30/0205 |
| | | | | 705/7.34 |
| 2015/0269624 | A1* | 9/2015 | Cheng | G06Q 30/0261 |
| | | | | 705/14.58 |
| 2015/0285643 | A1* | 10/2015 | Tucker | H04L 51/32 |
| | | | | 701/519 |
| 2016/0198301 | A1* | 7/2016 | Howe | G06Q 20/4014 |
| | | | | 455/456.2 |
| 2017/0163655 | A1* | 6/2017 | Ramalingam | G06Q 20/34 |

* cited by examiner

| | 402 TRANSACTION DATA | | | 404 ADDITIONAL DATA FROM MERCHANT/ACCT HOLDER | | 406 NOTIFICATION | |
|---|---|---|---|---|---|---|---|
| | 408 MERCHANT | 410 TXN DATE | 412 TXN AMOUNT | 414 ITEM DESCRIPTION | 418 TRIGGER PARAMETER | 420 NOTIFICATION PARAMETER | 422 TRIGGER EVENT | 424 NOTIFICATION CONTENT |
| 426 | MR. SPARKLE | 7/2/2015 | $9.99 | SHIRT | | | 7/4/2015 | YOUR DRY CLEANING IS READY FOR PICK-UP. |
| 428 | MR. SPARKLE | 7/2/2015 | $9.99 | | 3 DAYS | YOUR DRY CLEANING IS READY FOR PICK-UP. | 7/5/2015 | YOUR DRY CLEANING IS READY FOR PICK-UP. |
| 430 | SPRINGFIELD AUTO SERVICE | 7/2/15 9:00 AM | $39.95 | | | | 7/2/15 10:00 AM | YOUR OIL CHANGE IS COMPLETE. |
| 432 | SPRINGFIELD AUTO SERVICE | 7/2/15 9:00 AM | $54.95 | | | | 7/2/15 11:00 AM | YOUR TIRE ROTATION IS COMPLETE. |
| 434 | SPRINGFIELD AUTO SERVICE | 1/2/2015 | $39.95 | | 6 MONTHS | | 7/2/2015 | IT HAS BEEN SIX MONTHS SINCE YOUR LAST OIL CHANGE. WOULD YOU LIKE TO SCHEDULE AN OIL CHANGE NOW? |
| 436 | SPRINGFIELD ELEMENTARY | 8/21/2015 | $30.00 | | FRIDAYS DURING SCHOOL YEAR | DON'T FORGET TO PAY FOR NEXT WEEK'S SCHOOL LUNCHES. | 8/28/2015 | DON'T FORGET TO PAY FOR NEXT WEEK'S SCHOOL LUNCHES. SCHOOL IS CLOSED ON MON (9/7) FOR LABOR DAY SO THE COST IS $24.00. |

Fig. 4

PAIRING TRANSACTIONS AND NOTIFICATIONS

TECHNICAL FIELD

The present disclosure relates generally to facilitating financial transactions. More specifically, the present disclosure relates to systems and methods for pairing financial transaction events with notifications or alerts.

BACKGROUND

Financial institutions (FIs) (e.g., banks) facilitate financial transactions between account holders and other parties (e.g., merchants). Some transactions may require a follow-up activity to be performed by the payee account holder. For example, a transaction for dry cleaning may require that the payee account holder picks up the dry cleaned garments after the dry cleaning service is complete.

SUMMARY

Various embodiments relate to a computer-implemented method for providing a notification related to a transaction event between an account holder and a merchant. Transaction data relating to the transaction event between the account holder and the merchant is received from the merchant. The transaction event is associated with a financial account of the account holder. A notification is defined based on the transaction data. The notification includes a trigger event and notification content. The notification relates to a follow-up event to be performed by the account holder with the merchant. Upon occurrence of the trigger event, the notification is transmitted to the account holder.

Various other embodiments relate to a system for providing a notification relating to a transaction event between an account holder and a merchant. The system includes a server system. The server includes a processor and instructions stored in non-transitory machine-readable media. The instructions are configured to cause the server system to receive transaction data from the merchant. The transaction data relates to the transaction event between the account holder and the merchant. The transaction event is associated with a financial account of an account holder. A notification is defined based on the transaction data. The notification includes a trigger event and notification content. The notification relates to a follow-up event to be performed by the account holder with the merchant. Upon occurrence of the trigger event, the notification is transmitted to the account holder.

BRIEF DESCRIPTION OF THE DRAWINGS

FIG. 4 includes several tables illustrating transaction data, additional data, and a notification, according to an embodiment.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for pairing transactions with notifications are shown. In particular, the figures include a data processing system configured to receive transaction data related to a transaction event (e.g., a transaction authorization or pre-authorization) between an account holder and a merchant. The transaction event is associated with a financial account of an account holder. The transaction data is categorized according to a transaction taxonomy. A notification is defined based on the categorized transaction data. The notification includes a trigger event and notification content. The notification relates to a follow-up event to be performed by the account holder with the merchant. The notification is transmitted to the account holder upon the occurrence of the trigger event. In some embodiments, the trigger event relates to a service being completed or a good being purchased. In other embodiments, the trigger event relates to an anticipated service to be performed or good to be purchased. The data processing system is configured to manage alerts from multiple merchants.

Embodiments described herein provide the technical improvements of automatically associating transaction events with notifications. Such technical improvements save users time and effort by providing enhanced functionality while reducing the amount of information required to be inputted by users. In contrast, users conventionally must enter calendar entries and notifications, and maintain records associated with certain types of transaction events. This is particularly true for transaction events that require follow-up events or activities to be performed by the user with the merchant, such as picking up dry cleaning or scheduling maintenance events. Embodiments described herein also provide the technical improvement of providing more secure notifications by providing integrated notifications via an FI computing system to leverage the FI's sophisticated security systems and fraud detection mechanisms. Such technical improvements are necessarily rooted in computer-based technology. In particular, the technical improvements are necessarily rooted in the systems and networks required to process and provide notifications for financial transactions.

Figure 1:
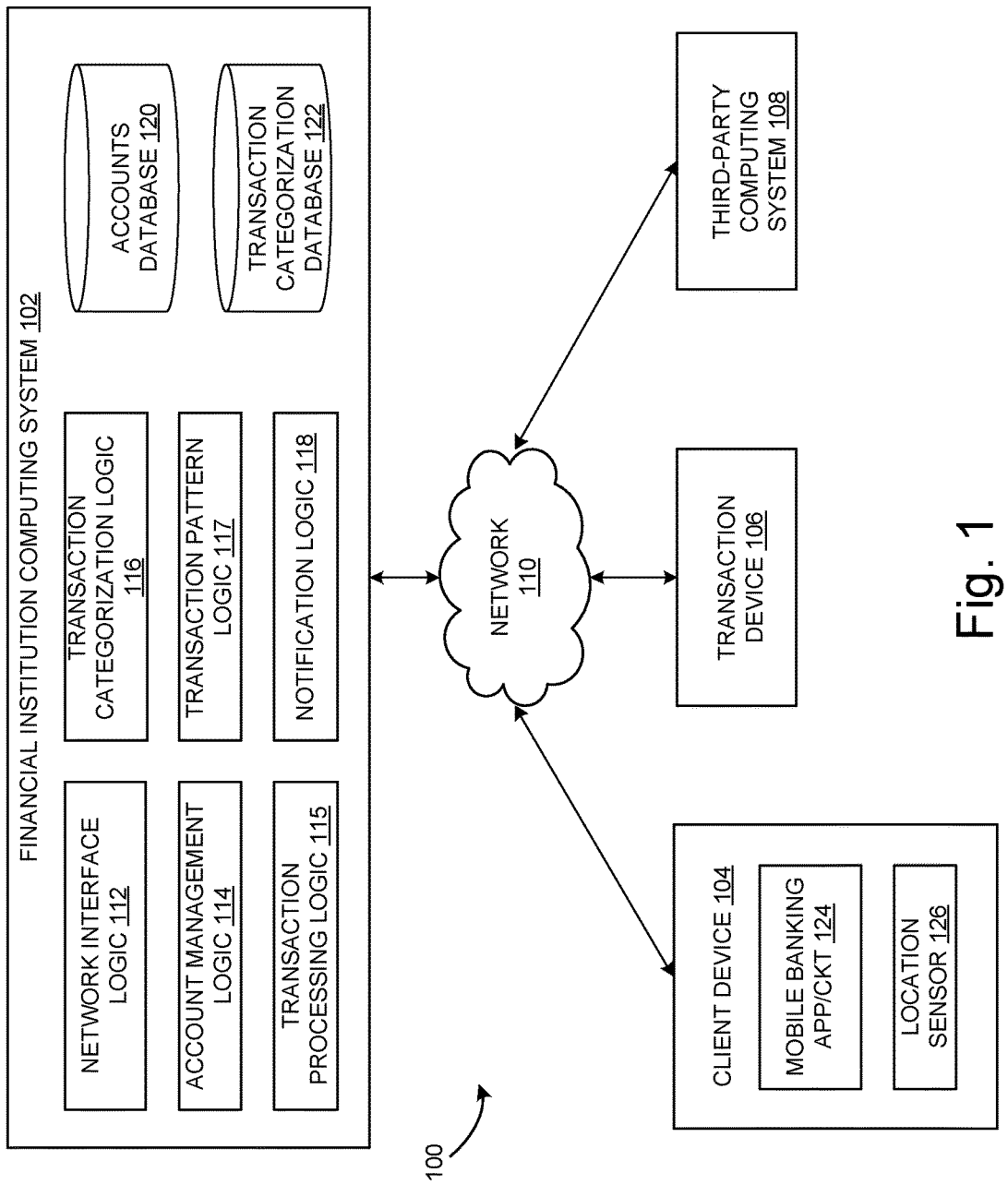
FIG. 1 is a schematic diagram of a data processing system, according to an embodiment.

FIG. 1 is a schematic diagram of a data processing system 100, according to an embodiment. The system 100 may be used to process financial transactions and notifications associated therewith. The system 100 may include, among other systems and devices, an FI computing system 102, a client device 104, a transaction device 106, and a third-party computing system 108. The FI computing system 102, the client device 104, the transaction device 106, and the third-party computing system 108 are in operative communication with each other via a network 110 (e.g., the Internet or an intranet).

The FI computing system 102 may be provided by an FI, such as a bank. FI computing system 102 is configured to, among other things, manage personal financial accounts at one or more FIs. In the example of FIG. 1, the FI computing system 102 is an enterprise computing system of an FI at which a user holds one or more financial accounts. The FI computing system 102 may include, among other logics, network interface logic 112, account management logic 114, transaction processing logic 115, transaction categorization logic 116, transaction pattern logic 117, and notification logic 118. Such logics and other logics discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the FI computing system 102 may include server-based computing systems, for example, comprising one or more networked computer servers that are programmed to perform the operations described herein. In another example, the FI computing system 102 may be implemented as a distributed computer system where each function is spread over multiple computer systems.

The network interface logic 112 of the FI computing system 102 may be used to establish connections between the FI computing system 102 and other components of the system 100, including the client device 104, the transaction device 106, and the third-party computing system 108, by way of the network 110. For example, the network interface logic 112 may comprise one or more web servers that provide a graphical user interface (e.g., a series of dynamically-generated web pages) for users that access the FI computing system 102 through an online platform. For the client device 104 (e.g., a smartphone or other mobile device), the network interface logic 112 may comprise servers that provide a user interface accessible as a mobile website or via an application executing on the client device 104, such as a mobile banking application. The user interface may be used to prompt an account holder to provide login information, passwords, or other authentication information or other stored tokens. Upon successfully logging in, the user interface may be used to provide the account holder with account information.

The account management logic 114 may interact with various backend systems in connection with maintaining financial accounts for account holders. For example, the account management logic 114 may manage payment accounts (e.g., checking and savings accounts, credit card accounts, etc.) of account holders. The account management logic 114 may store account information for various users' accounts in one or more accounts databases 120. The account management logic 114 manages each user's accounts by facilitating, among other things, account processing, account records, statement generation, budgeting, bill pay, funds transfers, etc. Account records include, among other things, records of financial transactions associated with each account. Financial transactions may include, for example, credits or debits to an account holder's account, such as the purchase of a good or the deposit of a paycheck, and various transaction data associated therewith. As described in further detail below, transaction data may include various identifying information for the transaction event, such as a payment amount, a transaction date and time, identifying information for the payor and/or the payee, location information, a time stamp for the transaction, etc.

The transaction processing logic 115 may be executed to process a transaction associated with the account holder. In an example embodiment, the transaction processing logic 115 receives a transaction authorization request (e.g., from the transaction device 106). The authorization request may include data related to the transaction such as a payment account identifier, payment amount, transaction date and time, recipient account identifier, etc. The transaction processing logic 115 processes the authorization request based on the transaction data and the account holder's payment account. The request may be received at the FI computing system 102 via the network interface logic 112. Upon processing the transaction authorization request, the transaction processing logic 115 returns a message indicating that the authorization request is either authorized or declined.

The transaction processing logic 115, in connection with the account management logic 114, may also manage tokenization and detokenization of sensitive account information, such as payment device (e.g., credit card) numbers or payment account numbers (PANs). Tokenization is used to replace sensitive information with a non-sensitive equivalent having limited extrinsic value (i.e., an electronic token). Instead of transmitting "track data" encoded on a payment card's magnetic strip, a merchant can transmit an electronic token to the FI computing system 102. The transaction processing logic 115 may receive the electronic token from the merchant and, in connection with the account management logic 114, resolve or detokenize the electronic token to derive the sensitive information. The transaction categorization logic 116 is configured to categorize transaction events according to a transaction taxonomy. For example, the transaction categorization logic 116 may receive transaction data from the transaction processing logic 115 in connection with a transaction authorization or pre-authorization request. The transaction categorization logic 116 may categorize the transaction event based on the transaction data according to the transaction taxonomy. Transaction taxonomy rules as well as categorized transactions may be stored in a transaction categorization database 122.

Transaction data may be collected with each swipe or tap (e.g., purchase or pre-authorization) of a payment device (e.g., a credit or debit card, a mobile wallet device, a smartphone, etc.). The transaction data may include one or more levels of transaction data, including at least one of Level 1, Level 2, and Level 3 transaction data. The transaction data may vary depending on the merchant or on the services or goods included in the transaction. For example, Level 1 transaction data may include a merchant name, a transaction amount, and a date. Level 2 transaction data may include further information relating to the transaction, such as tax amount, customer code, merchant postal code, tax identification, merchant minority code, merchant state code, item product codes, item descriptions and quantities, item tax rate, ship from postal code, freight amount, duty amount, destination postal code, destination country code, etc. Level 3 transaction data may include further information relating to particular types of transactions, such as a flight number and departure and arrival dates associated with an airline ticket; check-in/out dates associated with a hotel room or car rental reservation; or a delivery date associated with a shipping order. As mentioned above, the transaction data may also include tokenized data.

Additional existing or otherwise-gathered transaction data may also be included with the transaction data at the FI's or merchant's discretion. For example, a merchant may include a time period and notification message associated with the transaction event. The merchant may enter additional transaction data via the transaction device 106 or in other ways. The additional transaction data may be appended to the existing transaction data or may be transmitted in other ways.

In some embodiments the transaction data may be tokenized and the merchant may transmit notification data to the FI computing system 102. By utilizing tokenized data, the merchant does not have to store account holder data, such as credit card numbers or PANs, customer address information, etc. Instead, the FI computing system 102 may receive the tokenized transaction data and the notification data from the merchant, and manage notifications without requiring further activity from the merchant. Because the FI computing system 102 may manage notifications for multiple (any number of) merchants, the FI computing system 102 provides a secure, centralized system for managing notifications related to transaction events.

The transaction categorization logic 116 may augment the received transaction data with other information relating to the underlying transaction event. For instance, the transaction categorization logic 116 may interface with the third-party computing system 108 to access various accounts. The accounts accessed via the third-party computing system 108 may be non-financial accounts (e.g., calendar accounts, social networking accounts, data storage accounts, etc.) or other financial accounts held by the account holder. Information received from the third-party computing system 108 may be used to categorize incomplete or erroneous transaction data, for example.

Figure 2:
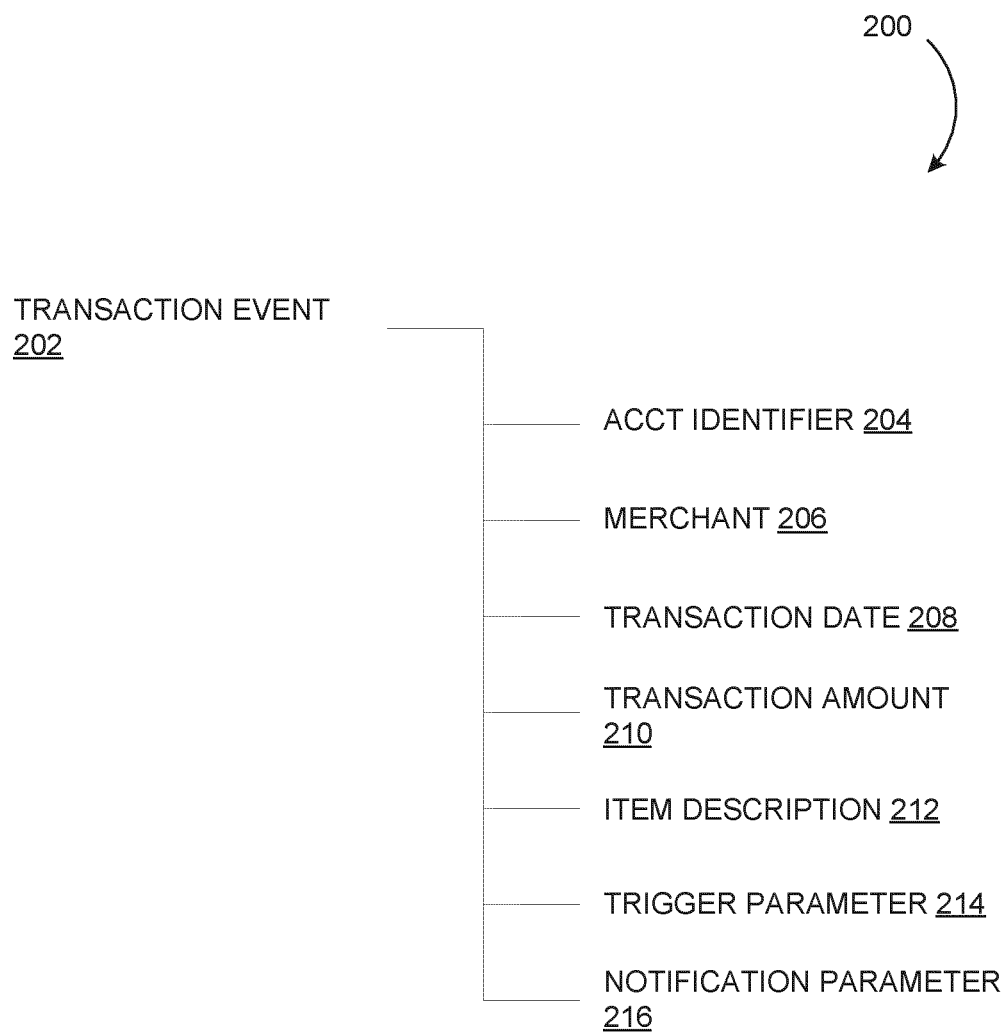
FIG. 2 illustrates an example transaction taxonomy used to categorize transaction events, according to an embodiment.

FIG. 2 illustrates an example transaction data fields 200 related to transactions events. For example, the transaction categorization logic 116 (FIG. 1) may categorize transaction events based on transaction data received (e.g., from the transaction device 106) in connection with the transaction event, according to the transaction taxonomy. The transaction taxonomy may be used to categorize transaction events from multiple merchants. The transaction data (e.g., according to the transaction data fields 200) may be used to define notifications and alerts for the transaction events for each of the multiple merchants. Accordingly, the transaction taxonomy enables a central entity (e.g., an FI) to manage notifications for multiple merchants.

As illustrated in FIG. 2, the transaction data fields 200 include several fields associated with a transaction event 202, including an account identifier 204, merchant 206, transaction date 208, transaction amount 210, item description 212, trigger parameter 214, and notification parameter 216. The transaction data may also include merchant-configurable information defining a preferred medium by which the account holder may reply to the notification. For example, the transaction data may include a phone number of the merchant or a link to a page on the merchant's website (e.g., an appointment reservation form). The transaction data may include data relating to any number of these or other fields.

Upon receiving the transaction data, the transaction categorization logic 116 must first parse the data into each of the data fields. In some situations, the transaction categorization logic 116 may also scrub the data to correct for naming inconsistencies, abbreviations, etc. Upon parsing the data, the transaction categorization logic 116 organizes the transaction data of the transaction event 202 into each of the data fields. The transaction event 202 may include more or fewer data fields than those shown in FIG. 2. For example, the transaction categorization logic 116 may parse the transaction data of a transaction event 202 and categorize the transaction event according to the transaction taxonomy to identify a transaction type based on the merchant 206. The transaction categorization logic 116 may manage different notifications for different types of transaction events. For example, one notification may be assigned to dry cleaning transaction events and a different notification may be assigned to vehicle service (e.g., oil change) events.

Referring back to FIG. 1, the transaction pattern logic 117 is configured to identify transaction history patterns based on the categorized transaction data of a plurality of transaction events. The categorized transaction data may be received from at least one of the accounts database 120 and the transaction categorization database 122, for example.

The transaction pattern logic 117 may further predict a future transaction event based on the identified transaction history patterns. The transaction history patterns may be analyzed based on various categorized data fields, such as transaction date, merchant, transaction amount, etc. For example, the transaction pattern logic 117 may identify that an account holder has conducted transactions with a particular merchant on the first of the month for the past six months. Accordingly, the transaction pattern logic 117 may predict that account holder will conduct another transaction with the same merchant on the first of the next month for the same transaction amount as the previous transactions.

The transaction pattern logic 117 may access other accounts (e.g., calendar accounts, social networking accounts, etc.) held by the account holder via the third-party computing system 108 or other systems to collect additional data relating to the account holder. The additional data can also be utilized to identify transaction patterns. For example, past transactions may be analyzed in conjunction with a calendar to match transactions with calendar entries.

The notification logic 118 of the FI computing system 102 is configured to define a notification related to the transaction event and to transmit the notification to the account holder. The notification logic 118 may manage notifications for multiple merchants. The transaction event may be a current transaction event (e.g., a transaction authorization or pre-authorization) or one or more past transaction events. Notification content may be included in the transaction data or may be determined by the notification logic 118 based on the transaction data and/or other information. For example, upon receiving transaction data indicating that the merchant is a particular dry cleaner, the notification logic 118 may cross-reference the merchant name with the transaction categorization database 122 to determine that that particular merchant provides a two-day turnaround on dry cleaning services. Accordingly, the notification logic 118 may prepare a notification to be sent two days from the transaction event (which, for example, may have occurred on Jun. 28, 2015) that includes a message stating "Remember to pick up your dry cleaning on Jun. 30, 2015." The notification content may be defined by the merchant, by the transaction pattern logic 117, and/or by the notification logic 118.

Notification content may also include receipt data. In embodiments involving tokenized data, merchants do not collect and securely store personal account holder information. Instead, such information is tokenized and is readable only by the FI computing system 102. In such examples, the notification logic 118 may be configured to provide notifications that include receipt data associated with transaction events. Mobile receipts provide advantages over paper receipts in terms of cost, security, and environmental impact. The FI computing system 102 provides advantages such as these by providing a centralized system for managing notifications and mobile receipts, as opposed to each merchant individually managing notifications and mobile receipts.

The notification logic 118 may determine notifications based on one or more categorization levels. For example, in one implementation, all transaction events from a particular merchant are assigned the same notification. For example, the notification may include a message that is sent a specific amount of time after a transaction event. In another implementation, two or more categorization levels are analyzed to determine the notification. For example, the notification logic 118 may recognize that transactions with a particular merchant for certain amounts or ranges may likely correspond to different services or products. For example, for a particular merchant, a transaction for one amount may correspond to a first service and a transaction for a different amount may correspond to a second service. Accordingly, the notification logic may define a first trigger parameter 214 and/or notification parameter 216 for the first service and a second trigger parameter 214 and/or notification parameter 216 for the second service.

In some embodiments, the notification logic 118 determines notifications for multiple merchants. The notifications may be determined based on the categorization of the transaction events according to the transaction taxonomy. For example, the notification logic 118 may provide standardized notifications or alerts for particular types of merchants. For example, the notification logic 118 may define a standardized notification for transaction events with any dry cleaner. Accordingly, the notification logic 118 provides a centralized tool for global management of notifications associated with transaction events from any merchant. In some embodiments, the notification logic 118 determines notifications and/or trigger events further based on a context determined from other information received from at least one of the client device 104, the transaction device 106, and the third-party computing system 108. Context can include any of various factors, such as geolocation, proximity to other devices or locations, other external conditions (e.g., traffic or weather), etc.

For example, the notification logic 118 may receive geolocation signals from the client device 104. The notification logic 118 may also receive mapping and/or traffic information from the third-party computing system 108. The notification logic 118 may identify, order, prioritize, etc., notifications based on this received data. For example, the notification logic 118 may recognize that an account holder has dry cleaning ready to be picked up and also has a library book due in three days. The notification logic 118 may, in connection with a notification to pick up the dry cleaning, suggest the most efficient route to the dry cleaner based on the received traffic and mapping information. Further, if the geolocation of the account holder is or will be (e.g., based on a navigation route) near the library, the notification logic 118 may suggest that the account holder may wish to return the library book before its due date because it may be convenient to do so. In other words, the account holder's proximity to the library may act as a trigger event for a notification relating to the library.

According to various embodiments, the client device 104 may include any of a smartphone, wearable device, augmented reality device, portable media device, laptop computer, tablet computer, PDA, etc. The client device 104 includes a processor and memory (not shown). The memory includes program modules that, when executed by the processor, control the operation of the client device 104. The memory may also store various applications, such as a mobile banking application of the FI that facilitates communication between the client device 104 and the various computing systems of the FI computing system 102. The memory may include any combination of RAM, ROM, NVRAM, etc.

The client device 104 also includes at least one network interface (not shown). In one example, the network interface is a wireless network interface. The network interface includes any of a cellular transceiver (e.g., CDMA, GSM, LTE, etc.), a wireless network transceiver (e.g., 802.11X, Bluetooth, NFC, Bluetooth Low Energy (BLE), RFID, ZigBee, etc.), or a combination thereof (e.g., both a cellular transceiver and a Bluetooth transceiver). The network interface is capable of communicating with another client device 104 (e.g., via 802.11x, Bluetooth, BLE, NFC, RFID, etc.). Additionally, the network interface is capable of communicating with the FI computing system 102 and with the third-party computing system 108 via its network interface over the network 110 (e.g., via the Internet as accessed through a cellular data network).

The client device 104 may include a mobile banking application/circuit 124. Notifications may be provided to the client device 104 via the mobile banking application or via another application (e.g., a "light" notification application that does not require full login credentials to be entered). For example, in some implementations, notifications are provided to the client device 104 via text message or email. The mobile banking application/circuit 124 may include program logic executable by the client device 104 to implement at least some of the functions described herein. In order to make the mobile banking app/circuit 124, the FI computing system 102 may provide a software application and make the software application available to be placed on the client device 104. For example, the FI computing system 102 may make the software application available to be downloaded (e.g., via the online banking website of the FI, via an app store, or in another manner). Responsive to a user selection of an appropriate link, the application may be transmitted to the client device 104 and may cause itself to be installed on the client device 104. Installation of the software application creates the mobile banking app/circuit 124 on the client device 104. Specifically, after installation, the thus-modified client device 104 includes the mobile banking app/circuit 124 (embodied as a processor and instructions stored in non-transitory memory that are executed by the processor).

In some embodiments, the client device 104 also include a location sensor 126 (e.g., a GPS device) for determining the geolocation of the client device 104. The mobile banking app/circuit 124 of the client device 104 may transmit geolocation signals to the FI computing system 102 or may itself use the geolocation signals to determine which notifications to display to the account holder.

The transaction device 106 may be used, for example, to execute transactions between merchants and FIs. The transaction device 106 may include any combination of hardware and/or software, including but not limited to point-of-sale (POS) devices, electronic and manual cash registers, scanners, touch screens, electronic funds transfer terminals, weighing scales, and any other wide variety of hardware and software available for use with the transaction device 106. In general, to perform a transaction, a merchant scans a payment device of an account holder, and a payment authorization request is transmitted from the transaction device 106 to the FI computing system 102. The FI computing system 102 verifies the payment device/account number, the transaction type, and the amount with the account holder's account, and reserves that amount of the account holder's balance or credit limit for the merchant. The FI computing system 102 may then either approve or decline the transaction authorization request based on the verification and further based on fraud prevention analysis. Upon receiving approval of the authorization request, the merchant may complete the transaction.

The transaction device 106 may utilize an application programming interface (API) provided by the FI computing system 102. The FI may also provide a plug-in or application that may be downloaded and run on the transaction device 106. The plug-in, application, or API may allow a merchant to interface with one or more of the logics and/or databases of the FI computing system 102. For example, the plug-in, application, or API may allow a merchant to define trigger parameters and/or notification parameters related to a transaction event via the transaction device 106. Trigger parameters and/or notification parameters may be configured based on the transaction taxonomy. The taxonomy may define the data stream that is sent from the merchant to the FI computing system 102. For example, the data stream may include some or all of the transaction data. The data stream may also include notification and trigger parameters.

In some implementations, the transaction device 106 may transmit certain transaction data to the FI computing system 102 independent of payment authorizations. In other words, the FI computing system 102 may manage notifications for transaction events in which payment is made by an FI other than the FI that manages the FI computing system 102. Thus, the FI computing system 102 may provide a centralized notification system for any transaction event, regardless of the FI from which payment is made. The third-party computing system 108 may include both public and private systems and accounts. For example, public systems within the third-party computing system 108 may include search, mapping, product review, navigation, traffic, etc. services (e.g., Google™, Here™, Waze™, Facebook™, Twitter™, Instagram™, Yelp™, FourSquare™, etc.). Private systems within the third-party computing system 108 may include, for example, calendar accounts, social networking accounts, personal organization accounts, data storage accounts, other financial accounts, etc., of the account holder. The accounts of both of the public and private systems of the third-party computing system 108 may be linked to the payment account of the account holder that is provided by the FI computing system 102, such that the FI computing system 102 is provided with permanent access to these accounts.

Each of the transaction categorization logic 116, the transaction pattern logic 117, and the notification logic 118 may search the accounts within the third-party computing system 108 for supplemental information to enhance the capability to perform various functions, such as categorization and notification, respectively. For instance, the transaction categorization logic 116 may search an account holder's geolocation at a particular time to verify an atypical (e.g., misspelled or abbreviated) merchant name associated with a transaction event conducted at that time.

In another example, the transaction pattern logic 117 may access the third-party computing system 108 to access data to predict future transaction events. For example, the transaction pattern logic 117 may access an account holder's grocery list (e.g., via Evernote™, an Outlook™ or Gmail™ task, a merchant website or app, a document, a smart appliance or connected home database, etc.) to predict a future transaction event including groceries that the account holder is likely to purchase in the near future. As another example, the transaction pattern logic 117 may access a current inventory of the account holder's groceries from a smart appliance (e.g., a refrigerator including a processor and memory and connected to the Internet) to predict a future transaction event. The notification logic 118 may define a notification based on the predicted future transaction event. The notification logic 118 may further utilize the third-party computing system 108 to optimize the notification. For example, the notification logic 118 may access a calendar of the account holder to send the notification at a time that is convenient for the account holder to complete the transaction.

Figure 3:
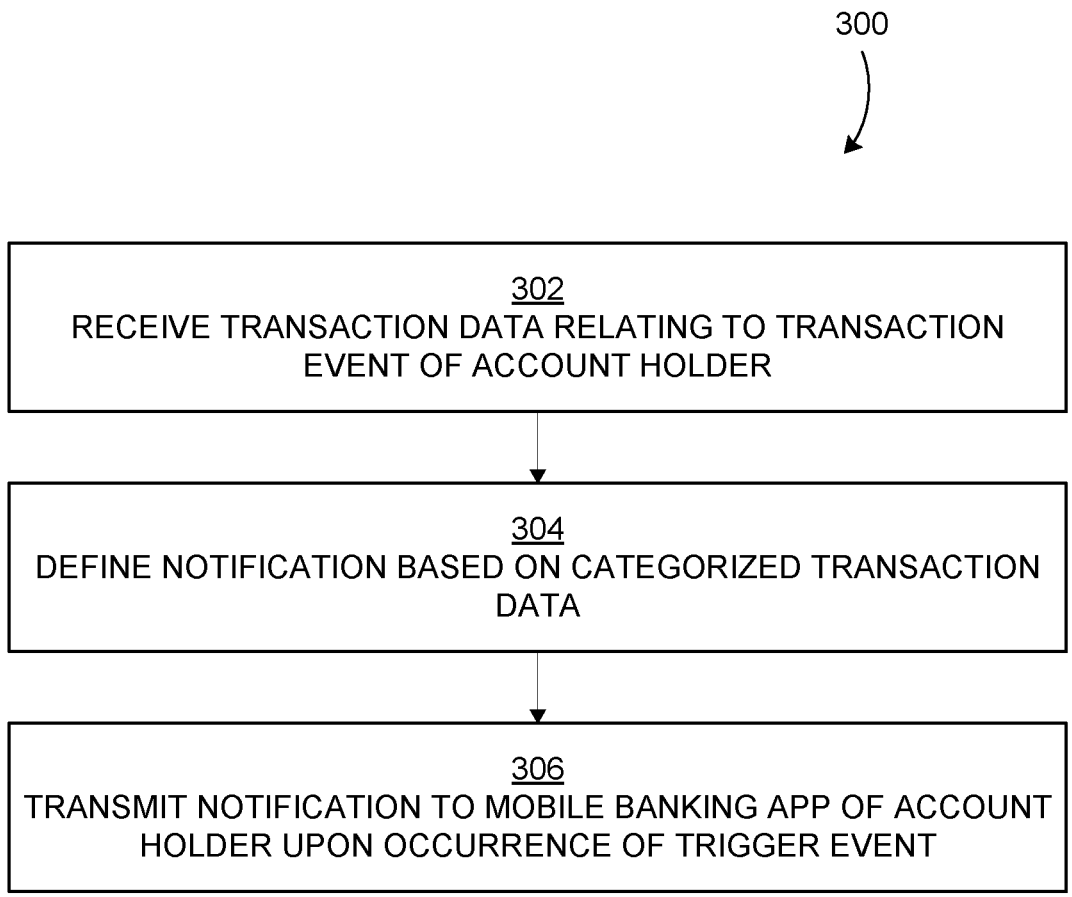
FIG. 3 is a flow diagram of a process for providing an alert related to a transaction event, according to an embodiment.

Referring now to FIG. 3, flow diagram of a process 300 for providing an alert related to a transaction event between an account holder and a merchant is illustrated, according to an embodiment. The process 300 may be performed using the FI computing system 102 shown in FIG. 1. More specifically, the process 300 may be performed using the transaction categorization logic 116 and the notification logic 118 of the FI computing system 102 of FIG. 1, in accordance with the transaction taxonomy 200 of FIG. 2. However, the process 300 may similarly be performed by other systems and devices.

At 302, transaction data relating to a transaction event between the account holder and the merchant is received from the merchant. The transaction event is associated with a financial account of the account holder. For example, upon the account holder attempting a transaction with a merchant, the transaction device 106 of the merchant may transmit an authorization request to the transaction processing logic 115 of the FI computing system 102. The transaction processing logic 115 may then transmit transaction data included in the authorization request to the transaction categorization logic 116. For example, the transaction data may include a merchant name, a transaction date, a transaction amount, an item description, etc. In some embodiments, the transaction categorization logic 116 may receive additional or supplemental information related to the transaction event. The additional or supplemental information may be received from the merchant (e.g., from the transaction device 106), or from other systems, such as the third-party computing system 108.

In some implementations, transaction data may not include a payment authorization request. For example, payment may be made from an FI other than the FI that manages the FI computing system 102. In other words, the FI computing system 102 may manage notifications independent of transferring payments for transaction events.

At 304, a notification is defined by the notification logic 118 based on the transaction data. The notification relates to a follow-up event to be performed by the account holder with the merchant. The notification includes a trigger event and notification content. The trigger event defines transmission of the notification. The notification is transmitted upon the occurrence of the trigger event. In one embodiment, the trigger event may include a point in time (e.g., a time and a date). In some embodiments, the trigger event is a time equal to the transaction date plus the trigger parameter. For example, a transaction event may have a transaction date of Jul. 2, 2015 at 9:00 AM with a trigger parameter of 3 days. Therefore, the trigger event is Jul. 5, 2015 at 9:00 AM. Trigger events may also be based on other factors. For example, the trigger event may be based on an indication received from an inventory tracking or logistics system (e.g., indicating order processing, shipping, delivery, etc.).

The trigger parameters and notification content may be defined by any of the merchant, the FI, and the account holder. Any of the merchant, the FI, and the account holder may specify default trigger parameters and notification content for particular types of transactions, and may also specify rules for defining specific trigger parameters and notification content. Trigger parameters and notification content may be included in the transaction data associated with the underlying transaction. The notification content may include various types of content, such as text, images, audio, calendar items, etc., or any combination thereof. The notification content may be defined by the notification logic 118 based at least in part on the categorization of the transaction event performed at 304. In some embodiments, the notification content may be provided by a merchant (e.g., defined by the merchant via the transaction device 106). For example, the notification content may be included in the transaction data associated with the underlying transaction. In some embodiments, the notification content may be inputted by the account holder via the mobile banking application 124 of the client device 104, or received via third-party computing system 108.

At 306, the notification is transmitted to the client device 104 of the account holder. The notification may be transmitted based on a "push," such as a notification initiated by the notification logic 118. The notification may also be transmitted by a "pull," such as a request or command initiated by the client device 104, for example. In some embodiments, the client device 104 (e.g., via the mobile banking application 124) includes a notification dashboard to display one or more notifications, which may be received from one or more parties (e.g., merchants). The notifications may be searched by various parameters, such as date, amount, location, merchant category, etc. Accordingly, the method 300 may be performed by a single centralized entity (e.g., FI) to manage notifications associated with transaction events from multiple merchants. The merchants, the FI, and the account holders may define preferences, notification content, trigger parameters, etc. via the notification logic 118.

In some embodiments, the account holder may provide a response to the notification. For example, the response may relate to performing a task related to the notification, such as conducting a transaction, scheduling an appointment, defining a second notification, etc.

Referring now to FIG. 4, several tables illustrating transaction data 402, additional data 404, and a notification 406 are shown, according to an embodiment. The transaction data 402 is associated with a transaction event and includes several data fields. For example, the transaction data 402 of FIG. 4 includes a merchant 408, transaction date 410, transaction amount 412, and item description 414. As mentioned above, the transaction data 402 may include more or fewer data fields than those shown in FIG. 4. According to an embodiment, the transaction data 402 has been categorized by the transaction categorization logic 116 according to the transaction taxonomy.

The additional data 404 includes other information associated with a transaction event. The additional data 404 may be received from the transaction device 106 (e.g., as part of the transaction data) and/or from third-party computing system 108. The additional data 404 may also be determined by the transaction categorization logic 116 and/or the notification logic 118 based on the transaction data. For example, the additional data 404 may include a trigger parameter 418 and a notification parameter 420. The trigger parameter 418 may relate to the conditions upon which a notification is to be sent. The notification parameter 520 may include some or all of the content to be included in the notification.

The notification 406 includes a trigger event 422 and notification content 424. The trigger event 422 may be a condition precedent for transmitting the notification content 424. The trigger event 422 may be a date and time or another type of event. In one embodiment, the trigger event 422 is a time equal to the transaction date 410 plus the trigger parameter 418. In another embodiment, the trigger event 422 includes different factors. For example, the trigger event 422 may include the occurrence of an event other than the transaction event. The notification content 424 is the message that is sent to the account holder (e.g., via the mobile banking application 124 of the client device 104). The notification content 424 may include text, images, audio, calendar items, etc., or any combination thereof.

426-436 are several examples of underlying transaction events having various combinations of transaction data 402, additional data 404, and notifications 406, according to several embodiments. Transaction event 426 is an example of a transaction event in which the notification logic 118 analyzes the transaction data 402 to determine the notification 406 without analyzing additional data 404. For example, the notification logic 118 may assign the same trigger event 422 and notification content 424 to transactions from a particular merchant. As shown in FIG. 4, for example, transaction event 426 relates to a dry cleaning payment or pre-authorization. The transaction event 426 includes a merchant 408 (Mr. Sparkle), a transaction date 410 (Jul. 2, 2015), a transaction amount ($9.99), and an item description (shirt). In this example, the notification logic 118 determines that the merchant 408 of the transaction event is Mr. Sparkle, which provides a two-day turnaround on dry cleaning services for shirts. For example, this parameter may be self-configured by the merchant, or defined by the FI or the account holder. Accordingly, the notification logic 118 defines the trigger event 422 to be Jul. 4, 2015, which is two days from the transaction date 410, and defines the notification content 424 to state "Your dry cleaning is ready for pick-up."

Transaction event 428 is an example of a transaction event that includes additional data 404, including a trigger parameter 418 (3 days) and a notification parameter 420 ("Your dry cleaning is ready for pick-up"). The additional data 404 may be included with the transaction data 402 (e.g., via the transaction device 106) or may be received independent of the transaction data 402 (e.g., via the third-party computing system 108). For example, a merchant may define certain additional data 404 to be included with particular transactions (e.g., particular services or products). In some embodiments, the additional data 404 may be defined by the account holder. For example, the account holder may specify that a particular notification is attached to all purchases from a particular merchant or from particular types of merchants. The account holder may enter the additional data, for example, 404 via the client device 104.

Transaction events 430 and 432 are examples in which the notification logic 118 considers two or more categorization fields to determine a notification content 424. In particular, the notification logic 118 analyzes both the merchant 408 and the transaction amount 412 to define trigger events 422 and notification content 424 for a single merchant 408. For example, transaction events 430 and 432 both involve the merchant 408 Springfield Auto Service (SAS) and have a transaction date 410 of Jul. 2, 2015 at 9:00 AM. The transaction event 430 has a transaction amount 412 of $39.95, which is the typical cost of an oil change at SAS. As such, the trigger parameter 418 is one hour, which is the typical time period required for an oil change at SAS. Therefore, the notification 406 includes a trigger event 422 of Jul. 2, 2015 at 10:00 AM, and notification content 424 stating "Your oil change is complete." The transaction event 432 has a transaction amount 412 of $54.95, which is the typical cost of a tire rotation at SAS. As such, the trigger parameter 418 is two hours, which is the typical time period required for a tire rotation at SAS. Therefore, the notification 406 includes a trigger event 422 of Jul. 2, 2015 at 11:00 AM, and notification content 424 stating "Your tire rotation is complete."

Transaction event 434 is an example of a notification relating to a predicted future transaction event based on identified transaction history patterns. In this example, the transaction categorization logic 116 categorizes transaction data of each of a plurality of transaction events, according to the transaction taxonomy. The transaction pattern logic 117 identifies transaction history patterns based on the categorized transaction data. For example, the transaction pattern logic 117 may identify that the account holder has transactions with merchant 408 SAS for oil changes approximately every six months. The previous transaction date 410 was Jan. 2, 2015. Accordingly, the transaction pattern logic 117 may predict that the account holder will perform the next oil change around Jul. 2, 2015. To that end, the notification logic 118 may define a notification 406 including a trigger event 422 of Jul. 2, 2015 and notification content 424 that states "It has been six months since your last oil change. Would you like to schedule an oil change now?" The notification 406 may include an input component, such as a button, that automatically schedules the oil change upon the account holder's selection thereof.

Transaction event 436 is an example of a notification relating to a predicted future transaction event and supplemental information from connected third-party computing systems 108. For example, transaction event 436, relates to school lunch payments for the merchant 408 Springfield Elementary. The trigger parameter 418 specifies Fridays during the school year and the notification parameter 420 is "Don't forget to pay for next week's school lunches." In this example, the transaction pattern logic 117 may identify that the account holder prepays for school lunches for the upcoming week on every Friday during the school year. The previous transaction date 410 is Aug. 21, 2015 for a transaction amount 412 of $30.00. Other transaction amounts 412 that occur on the same day every week are typically $30. If the transaction amounts 412 are less than $30, they are a multiple of $6 (e.g., $6, $12, $18, or $24). The transaction pattern logic 117 connects with the third-party computing system 108, such as a calendar associated with the merchant name (Springfield Elementary), to determine that transactions of less than $30 correspond to weeks in which school was closed on one or more days. Based on this information, the transaction pattern logic 117 may determine that lunches cost $6.00 each. The transaction pattern logic 117 may also determine that school will be closed on Labor Day (September 7) of the upcoming week. Accordingly, the transaction pattern logic 117 determines that school lunch payments for only four days ($24.00) rather than the typical five ($30.00) are required for the upcoming week. Therefore, the notification logic 118 defines a notification 406 having a trigger event 422 of Aug. 28, 2015 (the upcoming Friday, which is during the school year) and notification content 424 including the notification parameter 420, as well as the message "School is closed on Mon. (September 7) for Labor Day so the cost is $24.00."

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices.

User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method of providing a notification relating to a transaction event between an account holder and a merchant, the method comprising:

receiving, by a processor of a financial institution (FI) computing system, an electronic message comprising a trigger parameter for the notification, the trigger parameter specifying a timeframe for a trigger event expected, based on a pattern identified in past activity of the account holder, to occur at a future time relative to a point of time associated with receiving the electronic message, the trigger event related to a follow-up activity, relative to the transaction event, to be performed according to the trigger parameter by the account holder with the merchant;

receiving from the merchant, by the processor of the financial institution (FI) computing system, tokenized transaction data comprising transaction location information and relating to the transaction event between the account holder and the merchant, the transaction event associated with a financial account of the account holder;

detokenizing, by the processor, the tokenized transaction data;

receiving, by the processor, traffic information from a third-party computing system;

mapping, by the processor, geolocation information of the account holder to a navigation route determined based on the detokenized transaction data and the traffic information, the geolocation information being provided by a location sensor of a mobile device of the account holder, the mobile device comprising a mobile device processor, a mobile device memory and the location sensor;

defining, by the processor, the notification based on the detokenized transaction data and the geolocation information relative to the navigation route, the notification including the trigger event and notification content; and responsive to detecting an occurrence of the trigger event according to the trigger parameter, transmitting, by the processor upon occurrence of the trigger event, the notification to a mobile banking application of the mobile device of the account holder; and based on a comparison of the geolocation information of the account holder and the transaction location information, presenting the notification via the mobile banking application on a display of the mobile device.

2. The method of claim 1, wherein the transaction event is a first transaction event associated with a first merchant, and further comprising:

receiving, by the processor, second transaction data relating to a second transaction event, the second transaction event being associated with a second merchant and with the financial account of the account holder;

defining, by the processor, a second notification based on the second transaction data, the second notification including a second trigger event and second notification content; and transmitting, by the processor upon occurrence of the second trigger event, the second notification to the account holder.

3. The method of claim 1, wherein the transaction event includes a transaction authorization or a transaction preauthorization.

4. The method of claim 1, wherein the trigger event relates to an expected completion of a service relating to the transaction event.

5. The method of claim 1, wherein the trigger event relates to an anticipated purchase of a service or good relating to the transaction event.

6. The method of claim 1, further comprising providing a plurality of notifications, by the processor, on the display on the mobile banking application.

7. The method of claim 1, further comprising categorizing, by the processor, the transaction event based on the detokenized transaction data, according to a transaction taxonomy, wherein the notification is further based on a categorization of the transaction event.

8. The method of claim 1, further comprising receiving, by the processor from the merchant, a notification parameter associated with the transaction event, wherein the notification content is defined based at least in part on the notification parameter.

9. The method of claim 1, further comprising receiving, by the processor from the account holder via the mobile banking application of the mobile device, a notification parameter associated with the transaction event, wherein the notification content is defined based at least in part on the notification parameter.

10. The method of claim 1, further comprising accessing, by the processor, a non-financial account of the account holder, wherein the notification is defined further based on information received from the non-financial account.

11. The method of claim 1, further comprising:
receiving, by the processor from the account holder in response to the notification, a response from the account holder; and
performing, by the processor based on the response, at least one of conducting a transaction, scheduling an appointment, and defining a second notification.

12. The method of claim 1, the method further comprising based on the detokenized transaction data, generating and rendering on the mobile device, by the processor, a merchant-configurable electronic form, the merchant-configurable electronic form comprising a link to a communication channel specified by the merchant in the tokenized transaction data before the merchant-configurable electronic form is generated, the communication channel being a preferred medium to use to respond to the notification.

13. The method of claim 12, the method comprising responsive to receiving instruction from the account holder to activate the link to the communication channel, performing, by the mobile device, at least one of dialing a telephone number and navigating to a web page associated with the merchant.

14. The method of claim 1, wherein the notification is a light notification that does not require full login credentials to be entered through the mobile banking application of the mobile device of the account holder.

15. A system for providing a notification relating to a transaction event between an account holder and a merchant, the system comprising a processor and instructions stored in non-transitory machine-readable media, the instructions configured to cause the system to:
receive an electronic message comprising a trigger parameter for a notification, the trigger parameter specifying a timeframe for a trigger event expected, based on a pattern identified in past activity of the account holder, to occur at a future time relative to a point of time associated with receiving the electronic message, the trigger event related to a follow-up activity, relative to the transaction event, to be performed according to the trigger parameter by the account holder with the merchant;
receive tokenized transaction data from the merchant, the tokenized transaction data comprising transaction location information and relating to the transaction event between the account holder and the merchant, the transaction event associated with a financial account of the account holder;
detokenize the tokenized transaction data;
map, by the processor, geolocation information of the account holder to a navigation route determined based on the detokenized transaction data, the geolocation information being provided by a location sensor of a mobile device of the account holder, the mobile device comprising a mobile device processor, a mobile device memory and the location sensor;
define the notification based on the detokenized transaction data and the geolocation information relative to the navigation route, the notification including the trigger event and notification content; and
responsive to detecting an occurrence of the trigger event, transmit, upon occurrence of the trigger event according to the trigger parameter, the notification to a mobile banking application of a mobile device of account holder; and
based on a comparison of the geolocation information of the account holder and the transaction location information, present the notification via the mobile banking application on a display of the mobile device.

16. The system of claim 15, wherein the transaction event is a first transaction event associated with a first merchant, and wherein the instructions are further configured to cause the processor to:
receive second transaction data relating to a second transaction event, the second transaction event being associated with a second merchant and with the financial account of the account holder;
define a second notification based on the second transaction data, the second notification including a second trigger event and second notification content; and
transmit, upon occurrence of the second trigger event, the second notification to the account holder.

17. The system of claim 15, wherein the transaction event includes a transaction authorization or a transaction pre-authorization.

18. The system of claim 15, wherein the trigger event relates to an expected completion of a service relating to the transaction event.

19. The system of claim 15, wherein the trigger event relates to an anticipated purchase of a service or good relating to the transaction event.

20. The system of claim 15, wherein the instructions are further configured to cause the processor to provide a plurality of notifications on the display on the mobile banking application.

21. The system of claim 15, wherein the instructions are further configured to cause the processor to categorize the transaction event based on the detokenized transaction data, according to a transaction taxonomy, wherein the notification is further based on a categorization of the transaction event.

22. The system of claim 15, wherein the instructions are further configured to cause the processor to receive, from the merchant, a notification parameter associated with the transaction event, wherein the notification content is defined based at least in part on the notification parameter.

23. The system of claim 15, wherein the instructions are further configured to cause the processor to receive, from the account holder via the mobile banking application of the mobile device, a notification parameter associated with the transaction event, wherein the notification content is defined based at least in part on the notification parameter.

24. The system of claim 15, wherein the instructions are further configured to cause the processor to access a non-financial account of the account holder, wherein the notification is defined further based on information received from the non-financial account.

25. The system of claim 15, wherein the instructions are further configured to cause the processor to provide a plurality of notifications on the display on the mobile banking application of the mobile device.

26. The system of claim 15, wherein the instructions are further configured to cause the processor to:
   receive, from the account holder in response to the notification, a response from the account holder; and
   perform, based on the response, at least one of conducting a transaction, scheduling an appointment, and defining a second notification.

27. The system of claim 15, wherein the instructions are further configured to cause the processor to render, through the mobile device associated with the account holder, a merchant-configurable electronic form to the account holder to enable the account holder to respond to the notification, the merchant-configurable electronic form comprising a link to a communication channel specified by the merchant in the detokenized transaction data before the merchant-configurable electronic form is generated, the communication channel being a preferred medium to use to respond to the notification.

28. The system of claim 27, wherein the mobile device is selected from a group consisting of: a smartphone, a wearable device, an augmented reality device, a portable media device, a laptop computer, and a personal digital assistant (PDA).

29. The system of claim 15, further comprising a transaction device associated with the merchant, the transaction device programmably configured to generate the tokenized transaction data.

30. The system of claim 15, further comprising a transaction-pattern logic configured to predict a future transaction event based on information provided by a third-party computing system.

31. The system of claim 30, wherein the third-party computing system comprises a component selected from a group consisting of: a merchant application, a merchant website, a smart appliance, and an electronic document associated with the account holder.

32. The system of claim 30, wherein the notification is based on the predicted future transaction event.

* * * * *